United States Patent Office 3,578,487
Patented May 11, 1971

---

3,578,487
METHOD FOR RENDERING SUBSTRATES SOIL REPELLENT
Martin Knell, Ossining, and Eduard Karl Kleiner, Dobbs Ferry, N.Y., assignors to Geigy Chemical Corporation, Ardsley, N.Y.
No Drawing. Filed July 1, 1968, Ser. No. 741,298
Int. Cl. D06m *15/36;* B44d *1/02*
U.S. Cl. 117—121
6 Claims

ABSTRACT OF THE DISCLOSURE

Substrates, particularly textiles, are rendered soil, oil, and water repellent by the application thereto of compositions comprising polymers of N-(perfluoroalkanoyl) aminoethyl acrylate or N-(perfluoroalkanoyl)-N-lower alkyl-aminoethyl acrylates.

---

The invention concerns a method of providing soil repellent finishes for substrates. More particularly, it concerns a method of providing oil and water-repellent finishes for use in treating materials such as textiles, paper, leather, painted wooden and metallic surfaces, and the like.

The foregoing oil and water-repellent finishes are obtained by treating the substrate with a composition comprising a polymer of a compound of the formula:

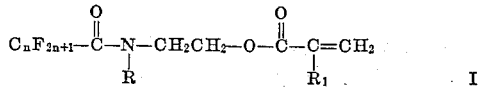

wherein $n$ is an integer of 3 to 17, preferably 6 to 14;
R is hydrogen, or alkyl of 1 to 3 carbon atoms, and is preferably hydrogen; and
$R_1$ is hydrogen or preferably methyl.

Compounds of the above Formula I and various methods for their preparation are disclosed in U.S. 3,304,278.

The clear indications of the prior art previous to the present invention were that the compounds of Formula I would not be of any practical use in providing soil, especially oil, repellent finishes.

Contrary to expected results based upon the teachings of the prior art, it has been found that excellent soil repellent finishes may be imparted to substrates such as textiles by compositions comprised of polymers of the compounds of Formula I above.

Merely by way of illustration, compositions comprising polymers of N-(perfluoroalkanoyl)-aminoethyl methacrylate compounds of Formula I impart significantly improved soil resistance to textiles than compositions of polymers comprising the corresponding N-tert-butyl substituted analogues of the compounds of Formula I which are employed according to the teachings of the prior art.

Polymers employed according to the method of this invention include both homopolymers and copolymers having a chain comprising repeating units of the structure:

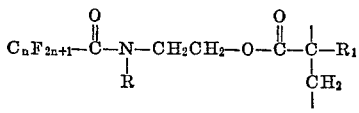

wherein $n$, R, and $R_1$ are as defined above, as well as physical blends of such homopolymers and copolymers together and/or with other polymers.

The copolymers of compounds of the above formulae are those formed with comonomers which contain an ethylenic linkage.

Illustrative of the said comonomers which contain an ethylenic linkage are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloroacrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like. Especially useful to form soil-repellent finishes are copolymers of esters of acrylic and methacrylic acids derived from alcohols containing from about 1 to about 16 carbon atoms, such as lauryl methacrylate, octyl methacrylate, hexyl acrylate, ethyl acrylate, 2-ethylhexylacrylate, and the like.

In the case of textile finishes, it is often advantageous to include in the monomer mixture from about 0.2 to about 5% by weight of a reactive acrylic, which permits crosslinking either by heat or crosslinking agents. Such reactive fluoro-copolymers give textile finishes with superior resistance to washing, dry cleaning, scrubbing, abrasion, and crushing, both wet and dry, and also a better durability of the oil and water repellency.

Such reactive monomers which may be included are by way of illustration: acrylic acid, methacrylic acid, acrylamide, methacrylamide, N-methylolacrylamide, 2-hydroxyethyl methacrylate or -acrylate, hydroxypropylacrylates or methacrylates, and t-butylaminoethyl methacrylate or glycidyl methylate. Of the foregoing, N-methylol acrylamide and 2-hydroxyethyl methacrylate are preferred.

In general all polymerization techniques and procedures as to kind and amount of catalyst, emulsifiers, chain regulators, solvents and the like are well within the capabilities of those skilled in the art to which this invention pertains.

For example, polymerization of the monomers used in the practice of the invention may be carried out in bulk, solution, suspension, or emulsion. The preferred polymerization techniques are emulsion polymerization in an aqueous medium and solution polymerization.

In emulsion polymerization, the monomer or monomers to be polymerized are emulsified together in a water solution of a surface active agent to a given monomer concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkyl thiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 20° to 90° C. The polymerization is generally most conveniently and preferably carried out at atmospheric pressure wherever possible.

In solution polymerization, the monomer or monomers are dissolved in a suitable solvent such as fluorinated solvents, for example, fluorohalogenated hydrocarbons, hexafluoroxylene, trifluorotoluene or mixtures thereof with acetone and/or ethylacetate, other fluorinated solvents and the like, and then polymerized in a reaction vessel using initiators such as azobisisobutyronitrile or other azo initiators at concentrations of 0.1 to 2.0% at 40–100° C. under nitrogen.

Coatings of the homopolymers and copolymers used in the present invention can be prepared and applied from solvent solutions or from aqueous emulsions. Suitable solvents are fluoroalkanes, fluorochloroalkanes, fluoroalkyl-substituted aromatics, alkyl esters of perfluoroalkanoic acids, chlorinated alkanes or aromatics, hydrocarbon aromatics, ketones, esters and ethers. Especially useful as solvents are the fluorinated liquids, and especially $\alpha,\alpha,\alpha$-trifluorotoluene, otherwise known as benzotrifluoride, hexa-fluoroxylene and mixtures of these with ethyl aceate or acetone and the like. Concentrations of the fluorinated polymers in solvent to provide coatings with effective oil and water repellency properties will generally be of the order of 0.01 to 10% and preferably from 0.1 to 2.0% by weight.

Blends of the emulsions of the polymers with blended emulsions of other polymers and copolymers are particularly useful in textile finishes. Such polymers and copolymers are generally of a non-fluorinated type; however, other fluorinated polymers and copolymers may be used if desired. Non-fluorinated polymers useful in such blends, include for example, polymers and copolymers of alkyl acrylates and alkyl methacrylates, such as methyl methacrylate, ethyl methacrylate, hexyl methacrylate, and n-octyl methacrylate. A particularly suitable polymer is poly(n-octyl methacrylate).

Besides applications to textiles, the coatings of the perfluorinated polymers used according to the present invention are useful in providing oil and water repellent coatings for leather, paper, wood, masonry, metals, plastics, glass, painted surfaces, and the like. Coatings may be readily applied by various coating techniques, such as those familiar to the art, such as dipping, spraying, brushing, padding, roll coating, and the like.

For evaluation purposes, the textile material in the examples below was dipped in the bath comprising the polymer to be evaluated and the amount of the retained solution adjusted so as to leave approximately 2% of latex by weight of the fabric on the fabric. The fabric is dried at room temperature and then cured in an oven at a temperature of about 175° C. for about 2 minutes.

The type of textile material which is coated is not at all critical. For evaluation purposes, repellency ratings for cotton or wool are determined as a standard screening procedure; however, such fibers such as fiberglass, silk, regenerated cellulose, cellulose esters and ethers, polyamides, polyesters, polyacrylonitrile, polyacrylic esters and other fibers alone or blended or in combination may be coated with the polymers used according to the present invention.

In the examples below, the repellency ratings were determined as follows:

The AATCC water spray test rating was determined according to Standard Test method 22–1966 of the American Association of Textile Chemists and Colorists, XXXVII, 1961, p. 1952 (also designated ASTM–D–583–58).

Oil repellency is measured by the 3-M-Oil test procedure of Grajek and Peterson, Textile Research Journal, April 1962, p. 323.

The following examples will serve to further illustrate the nature of this invention. It is to be understood that the examples are merely illustrative, and intended to enable those skilled in the art to practice the invention in all of the embodiments flowing therefrom and do not in any way limit the scope of the invention defined in the claims. Unless otherwise specified, the relationship of parts by weight to parts by volume is that of grams to cubic centimeters, and temperatures are degrees centigrade.

EXAMPLE 1

N-perfluorooctanoyl-N-tert-butylaminoethyl methacrylate

To a mixture of 32.9 parts of t-butylaminoethyl methacrylate and 10.4 parts of pyridine, stirred under a nitrogen atmosphere, is added dropwise 43.3 parts of perfluorooctanoyl chloride. The temperature of the reaction mixture rises spontaneously to 50° C., then is maintained at 50–57° C., for one-half hour. Ether, 50 parts by volume, is added and the solution is washed three times with 30 parts by volume of water, the ether layer is dried over anhydrous sodium sulfate and the ether is removed under reduced pressure. Ten parts of the 57.4 part residue is distilled at 20 microns pressure to yield 5.2 parts of N-perfluorooctanoyl - N - tert-butylaminoethyl methacrylate, boiling point 108–112° C.

*Analysis.*—Calc'd for $C_{18}H_{18}F_{15}NO_3$ (percent): C, 37.19; H, 3.12; F, 49.03. Found (percent): C, 37.61; H, 3.32; F, 49.18.

EXAMPLE 2

N-perfluoroisoundecanoyl-N-tert-butylaminoethyl methacrylate

To a mixture of 5.8 parts of t-butylaminoethyl methacrylate, 0.87 part of pyridine and 5 parts by volume of chloroform, stirred under a nitrogen atmosphere is added dropwise 5.8 parts of perfluoroisoundecanoyl chloride. After the exothermic reaction subsides, the reaction mixture is allowed to stand overnight at room temperature. An additional 10 parts of chloroform is added and the reaction mixture is washed three times with 10 parts by volume of water, dried and the solvent is removed on a rotary evaporator. The residue is taken up in 25 parts by volume of boiling heptane, cooled slowly and the insolubles separated by filtration. The heptane filtrate is then evaporated to dryness and the residue vacuum distilled at 0.010 mm. pressure to yield 2.12 parts of N-perfluoroisoundecanoyl - N - tert - butylaminoethyl methacrylate, boiling at 127–130° C.

*Analysis.*—Calc'd for $C_{21}H_{18}F_{21}NO_3$ (percent): C, 34.48; H, 2.48; F, 54.56. Found (percent): C, 34.77; H, 2.62; F, 54.80.

EXAMPLE 3

N-perfluoroisononanoyl-N-tert-butylaminoethyl methacrylate

To a solution of 2.47 parts of N-tert-butyl(aminoethyl) methacrylate and 1.1 parts of pyridine in 5 parts by volume of chloroform was added dropwise 5.1 parts of perfluoroisononanoyl chloride.

After standing overnight, the chloroform solution was washed several times with water and the chloroform removed under reduced pressure. The semi-solid residue was taken up in hot heptane, filtered and the heptane removed under reduced pressure. The oily residue was distilled at 5 microns pressure to yield 2.3 parts of N-perfluoroisooranoyl - N - tert - butylaminoethyl methacrylate, B.P. 117–119° C. at 0.010 mm. pressure.

EXAMPLE 4

N-(perfluoroisononanoyl)-aminoethyl methacrylate (a) N-(perfluoroisononanoyl) aminoethanol: A reaction flask is charged with 1.53 parts of ethanolamine and 5 parts of perfluoroisononanoyl chloride is added dropwise to the flask which is cooled in an ice bath. The reaction mixture is stirred during the addition. After the addition is completed, the mixture is heated to 80° C. for half an hour and then cooled to room temperature. The reaction mixture is then dissolved in chloroform, washed with water, and then with 10% hydrochloric acid, and finally again with water. The chloroform solution is then dried with molecular sieve overnight. The sieve is filtered out and the solution stripped under reduced pressure. 4.1 parts of white crystalline N - (perfluoroisononanoyl) aminoethanol identified by IR and VPC analysis and melting at 59–61° C. is obtained.

(b) N-(perfluoroisononanoyl) - aminoethyl methacrylate: 4 parts of N-(perfluoroisononanoyl) aminoethanol, 20 ml. of acetonitrile and 0.778 part of pyridine and 7.5 mg. hydroquinone are charged to a 50 ml. reaction flask. 1.03 parts of methacrylyl chloride dissolved in acetonitrile is added under nitrogen dropwise over a period of half an hour, the temperature being maintained at approximately 25° C. The reaction mixture is heated to 80° C. and maintained there with stirring for about one-half hour and then added to an excess of water. A viscous oil precipitates, the aqueous portion becoming milky white. The aqueous portion is extracted with chloroform. This is in turn saturated with sodium chloride and shaken with additional chloroform and the extract dried over molecular sieve. The chloroform is stripped and there is obtained as yield 1.8 parts of a cloudy oil. A continuous extraction of the aqueous solution with chloroform is performed over a period of three days and yields 0.9 additional parts which are combined with the 1.8 parts above.

The combined product comprising 2.7 parts is distilled and 2.15 parts of the portion boiling at 135–137.5° C. and 0.23 mm. Hg pressure are obtained.

*Analysis.*—Calc'd for $C_{15}H_{10}F_{17}NO_3$ (percent): C, 31.32; H, 1.75. Found (percent): C, 31.43; H, 1.81.

EXAMPLE 5

N-perfluorooctanoyl-N-ethylaminoethyl methacrylate

To 21.4 parts of methyl perfluorooctanoate under a nitrogen atmosphere in a 100 ml. flask, was added dropwise with stirring, 4.45 parts of 2-ethylaminoethanol. The addition was carried out over 70 minutes after which the reaction mixture was allowed to stand over the weekend. 25 parts by volume of acetonitrile and 8.7 parts of pyridine were then added and 11.51 parts of methacrylyl chloride were then added dropwise with stirring, keeping the temperature at 10–15° C. with the aid of an ice bath. The reaction was stirred for about one-half hour additional and then poured into water. The organic layer was separated, washed with water and dried over anhydrous magnesium sulfate. The crude product was distilled at 5 microns to yield 6.94 parts of N-perfluorooctanoyl-N-ethylaminoethyl methacrylate, boiling at 98–110° C.

EXAMPLE 6

N-(perfluorooctanoyl) aminoethyl methacrylate (a) N-(perfluorooctanoyl) aminoethanol: To 23.68 parts of ethanolamine in a 200 ml. flask, there is added dropwise over a two hour period 65.0 parts of perfluorooctanoyl chloride under a nitrogen atmosphere. The reaction mixture is then slurried in water, washed twice with 200 ml. of 10% hydrochloric acid, followed by washing with a large excess of water until a neutral pH is indicated. The filter cake is dried under vacuum and yields 63.7 parts of N-(perfluorooctanoyl) aminoethanol melting at 75–78° C. Following recrystallization from benzene, there is obtained 57 parts of product, melting at 78.5–80° C.

*Analysis.*—Calculated for $C_{10}H_6F_{15}NO_2$ (percent): C, 26.27; H, 1.32; F, 62.34. Found (percent): C, 26.65; H, 1.39; F, 61.80.

(b) N-(perfluorooctanoyl aminoethyl methacrylate: 20 parts of N-(perfluorooctanoyl) aminoethanol, 75 parts of acetonitrile, 4.23 parts pyridine and 0.30 part hydroquinone are charged into a 300 ml. flask under a nitrogen atmosphere. 5.71 parts of methacrylyl chloride are added dropwise over a two hour period while the temperature of the reaction mixture is maintained at 20° C. Following the addition of the methacrylyl chloride, the reaction mixture is stirred without cooling for 20 hours. Following this period, VPC indicates only a product peak. The reaction mixture is added to an excess of water and an oil precipitates out. The oil is separated from the aqueous phase and then crystallized completely. The aqueous phase is filtered and an additional amount of crystals are obtained which are then added to the above product. The combined crystal product is recrystallized from carbon tetrachloride, filtered and washed with carbon tetrachloride. The yield is 11.5 parts of N-(perfluorooctanoyl) aminoethyl methacrylate, melting at 56–60° C.

*Analysis.*—Calculated for $C_{14}H_{10}F_{15}NO_3$ (percent): C, 32.01; H, 1.91; N, 2.66. Found (percent): C, 31.80; H, 1.89; N, 2.86.

EXAMPLE 7

N-perfluorooctanoyl-N-propylaminoethyl methacrylate

Following the procedure of Example 5, substituting a stoichiometrically equivalent amount of 2-propylaminoethanol in lieu of the 2-ethylaminoethanol, there is obtained in a similar manner N-perfluorooctanoyl N-propylaminoethyl methacrylate.

EXAMPLES 8–13

Homopolymers of the fluoromonomers of Examples 1–6 are prepared and evaluated as textile finishes according to the following procedure:

10 parts of the fluoromonomer, 0.2 part of azobisisobutyronitrile and 20 parts of hexafluoroxylene are sealed under nitrogen in an ampul and polymerized for 16 hours at 80° C. The polymer solution is then diluted with 70 parts of hexafluoroxylene and precipitated under vigorous stirring into 2000 parts of methanol. The precipitated, white polymer is then filtered and dried. The $T_g$ and $T_m$ values are determined by differential thermal analysis The polymer samples are dissolved in benzotrifluoride or hexafluoroxylene (2% by weight solutions) and applied to cotton and wool to obtain 2% of the polymer on the fabric. The oil and water repellency ratings are evaluated by the 3–M–Oil test and the AATCC Water Spray test referred to previously.

The results of these tests are shown in the following Table I.

TABLE I

| Homopolymer of monomer of Example No.: | Concentration, dynes/cm. | Appearance | Differential thermal analysis, °C. $T_g$ | $T_m$ | Fabric | Repellency 3-M-Oil test | AATCC Water Spray test |
|---|---|---|---|---|---|---|---|
| 1 | 18 | White, brittle | +30 | +51 | Cotton | 60 | 70 |
|   |    |                |     |     | Wool   | 60 | 70 |
| 2 |    | do | Not distinct | Not distinct | Cotton | 60 | 60 |
|   |    |    |              |              | Wool   | 60 | 70 |
| 3 | 17.5 | do | +35 | +56 | Cotton | 60 | 60 |
|   |      |    |     |     | Wool   | 60 | 70 |
| 4 | 14 | do | +52 | +75 | Cotton | 80 | 90 |
|   |    |    |     |     | Wool   | 90 | 80 |
| 5 | 16 | do | +52 | +73 | Cotton | 80 | 60 |
|   |    |    |     |     | Wool   | 80 | 70 |
| 6 | 13 | do | +76 | +120 | Cotton | 100 | 70 |
|   |    |    |     |      | Wool   | 100 | 80 |

EXAMPLE 14

The homopolymer of Example 13 is blended with poly (n-octyl methacrylate) in different proportions into textile finishes and the resulting finishes tested for repellent characteristics as in Example 13 with the results indicated in following Table II.

TABLE II

| Composition of blend, percent by weight | | Repellency | | |
|---|---|---|---|---|
| Homopolymer of Example 13 | Poly-n-octyl methacrylate | Fabric | 3-M-Oil test | AATCC water spray test |
| 100 |    | Cotton | 100 | 75 |
|     |    | Wool   | 100 | 80 |
| 50  | 50 | Cotton | 80  | 80 |
|     |    | Wool   | 80  | 75 |
| 25  | 75 | Cotton | 80  | 75 |
|     |    | Wool   | 90  | 75 |
| 10  | 90 | Cotton | 50  | 70 |
|     |    | Wool   | 70  | 75 |

EXAMPLE 15

Finishes of copolymers of the fluoromonomer of Example 6 and n-octyl methacrylate as the comonomer are prepared following the polymerization method of Examples 8–13. The repellency of the finishes comprised of these copolymers is shown in Table III.

| Copolymer composition, percent by weight | | Repellency (2% polymer on fabric) | | |
|---|---|---|---|---|
| Monomer of Example 6 | n-Octyl methacrylate | Fabric | 3-M-Oil test | AATCC water spray test |
| 90 | 10 | Cotton | 90 | 75 |
|    |    | Wool   | 90 | 80 |
| 80 | 20 | Cotton | 70 | 70 |
|    |    | Wool   | 80 | 80 |
| 60 | 40 | Cotton | 70 | 60 |
|    |    | Wool   | 80 | 80 |
| 40 | 60 | Cotton | 50 | 60 |
|    |    | Wool   | 70 | 70 |

EXAMPLE 16

In a similar manner finishes of copolymers of the fluoromonomer of Example 5 and n-octyl methacrylate are prepared and the repellencies evaluated with the results indicated in Table IV.

| Copolymer composition, percent by weight | | Repellency (2% polymer on fabric) | | |
|---|---|---|---|---|
| Monomer of Example 5 | n-Octyl methacrylate | Fabric | 3-M-Oil test | AATCC water spray test |
| 80 | 20 | Cotton | 70 | 60 |
|    |    | Wool   | 80 | 60 |
| 67 | 33 | Cotton | 50 | 60 |
|    |    | Wool   | 70 | 60 |
| 56 | 44 | Cotton | 0  | 60 |
|    |    | Wool   | 60 | 60 |

As is apparent from the results in the foregoing examples, the polymers employed in soil repellent finishes according to the practice of this invention impart substantial oil and water repellent properties to the surface treated and in fact significantly exceed the results obtainable according to the practice of the prior art.

While the invention has been explained by detailed description of certain specific embodiments, it is understood that various modifications and substitutions can be made in any of them within the scope of the appended claims which are intended also to include equivalents of such embodiments.

We claim:
1. A method for rendering a substrate soil repellent which comprises applying to said substrate a liquid carrier containing a polymer having a skeletal chain comprising repeating units of the formula:

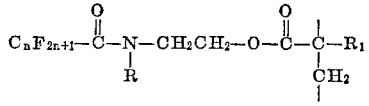

wherein
$n$ is an integer of 3 to 17;
R is hydrogen or alkyl of 1 to 3 carbon atoms; and
$R_1$ is hydrogen or methyl;
drying the substrate and then curing the thus coated fabric.
2. A method as claimed in claim 1 wherein $n$ is an integer of 6 to 14.
3. A method as claimed in claim 1 wherein R is hydrogen.
4. A method as claimed in claim 1 wherein R is ethyl.
5. A method as claimed in claim 3 wherein $R_1$ is methyl.
6. A method as claimed in claim 1 wherein the polymer is a homopolymer.

References Cited
UNITED STATES PATENTS
2,803,615   8/1957   Ahlbrecht et al.   260—29.6
3,304,278   2/1967   Hauptschein et al.   260—29.6

MURRAY KATZ, Primary Examiner
T. G. DAVIS, Assistant Examiner

U.S. Cl. X.R.
117—138.8, 139.5, 141, 143, 145